Nov. 15, 1949  C. A. FLOOD  2,488,280
SLIP-LOOP STRING TAG
Filed May 11, 1945
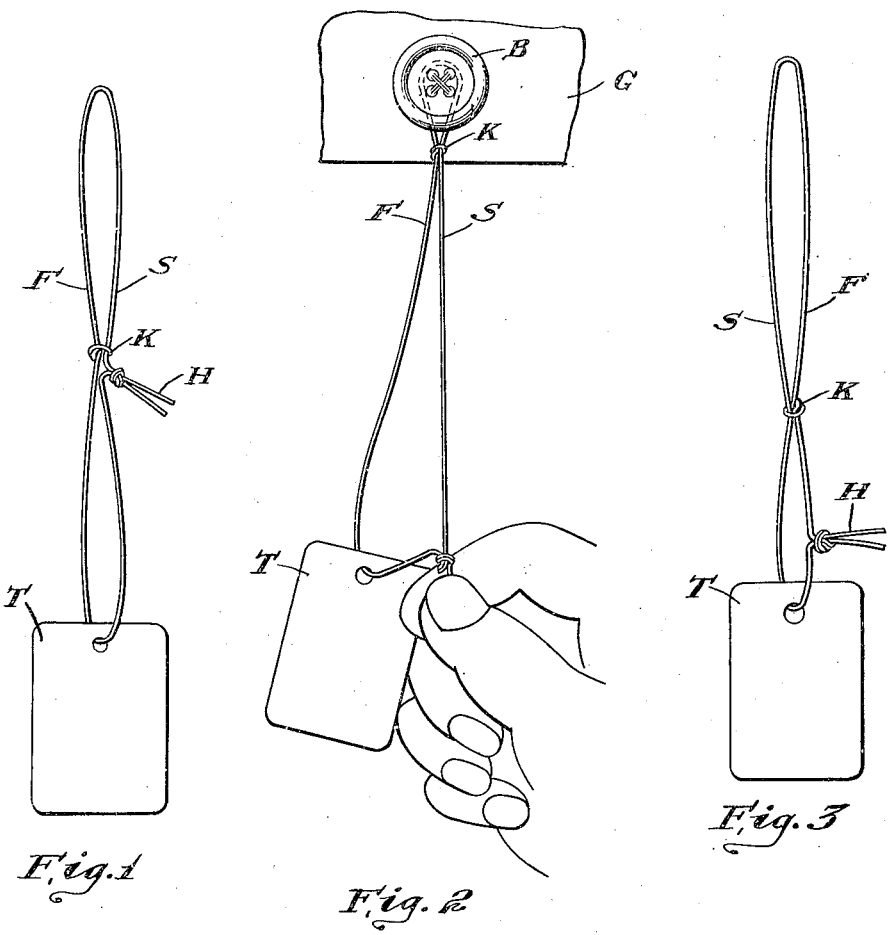
Inventor
Carl A. Flood
by Roberts, Cushman & Grover
Att'ys.

Patented Nov. 15, 1949

2,488,280

UNITED STATES PATENT OFFICE 2,488,280

SLIP-LOOP STRING TAG

Carl A. Flood, Framingham, Mass., assignor to Dennison Manufacturing Company, Framingham, Mass., a corporation of Massachusetts Application May 11, 1945, Serial No. 593,218

3 Claims. (Cl. 40—20)

This invention relates to string tickets such as commonly used as shipping tags and labeling tags, and more particularly to tags of the type having an opening therein and a string-loop extending through the opening.

Objects of the present invention are to provide a string tag which is simple and economical in construction, which can be quickly and easily applied to buttons on wearing apparel and the like, which remain attached without danger of accidental displacement, and which are generally superior to string tags such as used heretofore.

According to the present invention the improved tag has, in addition to the string-loop extending through the opening of the tag, a knot interconnecting the opposite sides of the loop to divide the loop into two sub-loops comprising a tag sub-loop extending through the tag opening and a free sub-loop adapted to be applied over a button or the like, the knot being fast to one side of the loop and the other side of the loop extending through the knot and being slidable therein to vary the relative sizes of the sub-loops, whereby the tag may be attached to a garment by placing the free sub-loop over a button and then contracting it around the button by sliding the other side of the loop through the connector as aforesaid, the string-loop having a handle located in the tag sub-loop for use in contracting the free sub-loop around the button.

A convenient way to form a handle is to tie the two ends of the string together, the tie serving as a handle.

In a more specific aspect, the handle is located in said other side of the string-loop and in said tag sub-loop so that a pull on the handle contracts the free sub-loop around the button. By locating the handle in the slidable side of the loop, instead of the side fast to the knot, the free sub-loop may be drawn around the button merely by pulling on the handle. If the handle is located in the side of the loop fast to the knot, then it is necessary to grasp the handle in one hand and the tag in the other hand and pull the two in opposite directions.

In a still more specific aspect the handle is located in said tag sub-loop approximately midway between the knot and the adjacent point of said other side of the loop when the free sub-loop is contracted around a button. By locating the handle in the tag sub-loop approximately midway between the knot and the adjacent point of the slidable side of the loop, when the free sub-loop is contracted around a button, the free sub-loop is large enough to lasso a button when the handle is adjacent the knot and at the same time the free sub-loop may be contracted closely around a button in response to a single straight pull on the handle.

For the purpose of illustration a typical embodiment of the invention is shown in the accompanying drawings in which Fig. 1 is a side view of one embodiment with the handle adjacent the knot to make the free sub-loop as large as possible;

Fig. 2 is a similar view showing the free sub-loop drawn around a button and the handle approximately midway between the connector and the adjacent point of the slidable side of the loop; and Fig. 3 is a view similar to Fig. 1 showing another modification in which the handle is in the side of the loop which is fast to the knot instead of being in the side of the loop which is slidable in the knot as in Fig. 1.

The particular embodiment chosen for the purpose of illustration in Fig. 1 comprises a tag T and a piece of string having its ends tied together in the form of a knot H, the knot and free ends of the string serving as the aforesaid handle. Before the ends of the string are tied together a knot K is tied in the left-hand side F of the loop, the knot surrounding the other or right-hand side S of the loop so that the latter side is slidable through the knot K. Thus the knot K divides the loop of string into two sub-loops, a lower tag sub-loop extending through the opening of the tag and an upper free sub-loop adapted to lasso a button. The knot or handle H is disposed in the tag sub-loop on the slidable side S of the loop as shown in Fig. 1 and preferably approximately midway between the knot K and the adjacent point of side S of the loop when the free sub-loop is contracted around a button as shown in Fig. 2. To apply the tag to a button B on a garment G the free sub-loop is placed around the button and the handle H is pulled to the position shown in Fig. 2, whereupon the free sub-loop is contracted around the button while the tag sub-loop is correspondingly enlarged.

The modification shown in Fig. 3 is like that shown in Fig. 1 except in that the knot K is in the right-hand side F of the loop and the left-hand side S is slidable through the knot, instead of vice versa as in Fig. 1. In this modification the knot or handle H is disposed in the tag sub-loop on the non-slidable side F of the loop. To apply the tag of Fig. 3 it is necessary to grasp the tag T in one hand and the knot or handle H in the opposite hand and to pull in opposite directions thereby to contract the free sub-loop about the button while the tag sub-loop is correspondingly enlarged.

It should be understood that the present disclosure is for the purpose of illustration only and that this invention includes all modifications and equivalents which fall within the scope of the appended claims.

I claim:

1. A device of the character referred to comprising a tag having an opening therein, a string-loop extending through the opening, a knot for dividing the loop into a tag sub-loop extending through the opening and a free sub-loop adapted to lasso a button or the like, the knot being fast to one side of the string-loop, the other side of the string-loop extending through the knot and slidable therein for varying the relative sizes of the sub-loops, whereby the tag may be attached to a garment by placing the free sub-loop over a button and then contracting it around the button by sliding the other side of the string-loop through the knot, the string-loop having a handle located in the tag sub-loop for use in contracting the free sub-loop around the button.

2. A device of the character referred to comprising a tag having an opening therein, a string-loop extending through the opening, a knot for dividing the loop into a tag sub-loop extending through the opening and a free sub-loop adapted to lasso a button or the like, the knot being fast to one side of the string-loop, the other side of the string-loop extending through the knot and slidable therein for varying the relative sizes of the sub-loops, whereby the tag may be attached to a garment by placing the free sub-loop over a button and then contracting it around the button by sliding the other side of the string-loop through the knot, the loop comprising a piece of string having its ends secured together by a tie to form a handle located in said tag sub-loop for use in contracting the free sub-loop around the button.

3. A device of the character referred to comprising a tag having an opening therein, a string-loop extending through the opening, a knot for dividing the loop into a tag sub-loop extending through the opening and a free sub-loop adapted to lasso a button or the like, the knot being fast to one side of the string-loop, the other side of the string-loop extending through the knot and slidable therein for varying the relative sizes of the sub-loops, whereby the tag may be attached to a garment by placing the free sub-loop over a button and then contracting it around the button by sliding the other side of the string-loop through the knot, the loop comprising a piece of string having its ends secured together by a tie to form a handle which is located in said slidable side of said string-loop and in said tag sub-loop so that a pull on the handle contracts the free sub-loop around the button.

CARL A. FLOOD.

REFERENCES CITED

The following references are of record in the file of this patent:

UNITED STATES PATENTS

| Number | Name | Date |
| --- | --- | --- |
| 30,969 | Hews | Dec. 18, 1860 |
| 134,756 | Marston | Jan. 14, 1873 |
| 209,281 | McKenzie, Jr. | Oct. 22, 1878 |
| 277,494 | Lindsay | May 15, 1883 |
| 971,804 | Thompson | Oct. 4, 1910 |
| 1,164,450 | Bates | Dec. 14, 1915 |
| 1,243,865 | Orr | Oct. 23, 1917 |
| 1,455,879 | Gronlund | May 22, 1923 |
| 1,473,393 | Albertoni | Nov. 6, 1923 |
| 1,524,893 | Thompson | Feb. 3, 1925 |
| 1,979,508 | Van Den Bel | Nov. 6, 1934 |
| 2,246,091 | Forsterner | June 17, 1941 |

OTHER REFERENCES

Encyclopedia of Knots and Fancy Rope Work, by Raoul Graumont and John Hensel, published in 1945 in New York by the Cornell Maritime Press, 4th edition, page 513, Plate 279, Figure 368B.